United States Patent

Jons

[11] Patent Number: 5,800,610
[45] Date of Patent: Sep. 1, 1998

[54] METHOD FOR MANUFACTURING CEMENT CLINKER

[75] Inventor: Ebbe S. Jons, Valby, Denmark

[73] Assignee: F.L. Smidth & Co. A/S, Denmark

[21] Appl. No.: 836,434

[22] PCT Filed: Sep. 25, 1995

[86] PCT No.: PCT/DK95/00381
§ 371 Date: May 9, 1997
§ 102(e) Date: May 9, 1997

[87] PCT Pub. No.: WO96/15076
PCT Pub. Date: May 23, 1996

[30] Foreign Application Priority Data

Nov. 11, 1994 [DK] Denmark ............... 1295/94

[51] Int. Cl.$^6$ .................................... C04B 7/42
[52] U.S. Cl. .............. 106/743; 106/753; 106/757; 106/765; 432/14
[58] Field of Search .................. 106/739, 753, 106/757, 765, 743; 432/14

[56] References Cited

U.S. PATENT DOCUMENTS

| | | | |
|---|---|---|---|
| 3,857,714 | 12/1974 | Mehta | 106/772 |
| 4,040,853 | 8/1977 | Binder et al. | 106/757 |
| 4,997,363 | 3/1991 | Hundebol | 432/14 |
| 5,049,198 | 9/1991 | Ribas | 106/765 |
| 5,356,472 | 10/1994 | Odler | 106/772 |
| 5,556,459 | 9/1996 | Cohen et al. | 106/763 |
| 5,626,667 | 5/1997 | Bohle | 106/772 |

OTHER PUBLICATIONS

GHOSH, "Advances In Cement Technology", Pergamon Press, pp. 40–47, [No Date].
ALSOP et al, "Cement Plant Operations Handbook", Tradeships. Publ. Ltd, pp. 7–9, [No Date].

Primary Examiner—Anthony Green
Attorney, Agent, or Firm—Baker & Botts, L.L.P.

[57] ABSTRACT

The invention relates to a method for manufacturing cement clinker whereby the raw meal is initially subjected to preparatory processing, e.g. by comminution, homogenization and/or drying, and, eventually, nodulized and burned, with the nodulization process itself taking place in a stationary burning reactor. By the method according to the invention a sulphatic compound is added to the raw meal in a sufficient quantity before introducing the raw meal into the stationary burning reactor or directly into the stationary reactor, e.g. through the combustion air or together with the fuel. The sulphatic compound may be selected among all types of sulphates which will not affect the properties of the finished cement. It is particularly advantageous to use calcium sulphate, either naturally occurring or industrial by-products and regular waste materials, e.g. used absorbent from dry exhaust gas desulphurization. In order that the method according to the invention can be carried out it is preferred that the sulphate content of the calcined raw meal be considerably higher than the alkali oxide content, in accordance with the following formula (the percentages indicated are percentages by weight):

$$\%SO_3 > \%K_2O + 1.5 \cdot \%Na_2O$$

where the $SO_3$ percentage represents the total content of sulphate in the material streams introduced into the process.

4 Claims, 1 Drawing Sheet

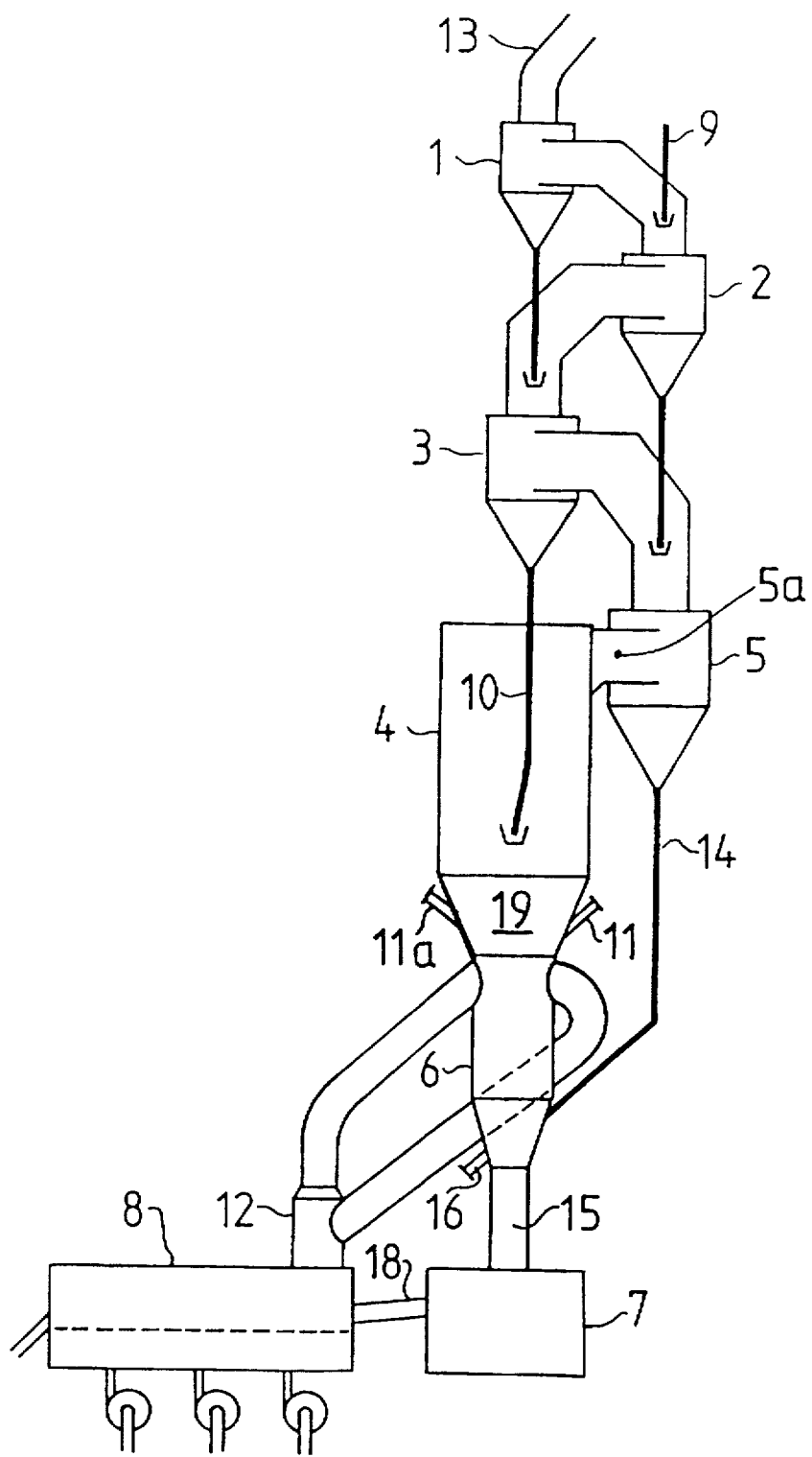

METHOD FOR MANUFACTURING CEMENT CLINKER

BACKGROUND OF THE INVENTION

1. Field of the Invention

The present invention relates to a method for manufacturing cement clinker by which method the raw meal is subjected to preparatory processing, e.g. by comminution, homogenization and/or drying, whereafter the raw meal is preheated and calcined and, eventually, nodulized and burned, and where nodulization takes place in a stationary burning reactor.

A stationary burning reactor is defined as a reactor with stationary walls as opposed to a rotary kiln. The most prevalent types of stationary reactors are fluid bed or spouted bed reactors.

Nodulization and clinkerization take place when the preheated and possibly calcined cement raw meal, subject to simultaneous input of heat and a consequential formation of a melting phase, is transformed from a particle-formed material with a fineness which is typically less than 15% in excess of 0.090 mm into a grained or ball-shaped material with a fineness of more than 80% in excess of 0.5 mm.

In the general cement clinker manufacturing process, the formed melting phase is an oxide fusion which is formed at a temperature of approximately 1300° C. and with a composition which is roughly as follows: 55% CaO, 6% $SiO_2$, 23% $Al_2O_3$ and 17% $Fe_2O_3$, and where the oxide fusion will normally constitute 15–25% of the total clinker mass.

In the vast majority of existing manufacturing plants, clinkerization takes place in a rotary kiln. Given that the costs of construction and the expenditure relating to the maintenance of the rotary kiln are very high because of the moving parts, numerous attempts have been made to eliminate the need for the rotary kiln in the cement manufacturing process.

2. Description of the Prior Art

It is known practice, e.g. from the published German patent application No. 42 19 697, to manufacture cement clinker according to a method where the burning of the calcined material is effected in two stages and where the first stage consists of a fluid bed or spouted bed. In this first stage the raw meal is heated to a presintering temperature, at which a melting phase is formed, and clinkerization is initiated once the melting phase is present. The material is subsequently directed to the second stage where the clinker is eventually burned at a temperature of minimum 1300° C.

However, practical implementation of this method is difficult due to the fact that the melting phase formed occurs within a range of a few degrees, hence making it extremely difficult to maintain the process conditions necessary to ensure constant presence of a predetermined, small amount of melting phase. This may, in particular, pose problems since the amount of fused material depends to a major degree on the composition of the raw meal, and not just on the temperature.

In the U.S. patent application Ser. No. 2.465.420 a process is described for calcination and nodulization of calcareous sludge using a salt fusion of alkali metals. Such a salt fusion is not always suitable for the manufacture of cement since an excessively high content of alkali metals in the finished cement may give rise to the formation of expanding reaction products, which will lead to cracks in the finished concrete.

In Danish patent application No. 1579/85 is described a method for treatment of a used absorbent from a dry exhaust gas desulphurization process. Since, according to the method described in this application, presence of a certain amount of chlorides is a precondition, it would not be advantageous to use this method for manufacturing cement clinker since chlorides may cause operational problems in the form of cakings in preheater and calciner.

It is prior art to add to the raw meal for manufacturing cement up to about 5% gypsum together with fluorine in order to lower the temperature at which $C_3S$ is formed, and hence also the burning temperature, but up to this point in time the nodulization and burning of these cements have been carried out in rotary kilns.

SUMMARY OF THE INVENTION

By means of this invention a method is thus indicated for the manufacture of cement which will eliminate operational problems and the addition of unwanted substances, such as chlorides, while, at the same time, the nodulization and the burning of the clinker can be carried out in a stationary reactor, in which there are specific requirements with respect to the controlling of fused material formation.

According to the invention, this is achieved by addition of a sulphatic compound to the raw meal in a sufficiently large quantity prior to the introduction of the raw meal into the stationary burning reactor or by addition of a sulphatic compound directly into the stationary reactor, e.g. through the combustion air or together with the fuel.

It is surprising that the addition of a sulphatic compound, which does not necessarily itself have to be capable of melting, can cause a melting phase to be formed in the material in the stationary reactor and that the melting phase which is formed satisfies the requirement that it must be possible to regulate the extent of the melting phase by controlling the temperature. However, a temperature range exists between 1000°–1300° C. in which the added sulphate compound may be mixed with the natural content of alkali metals of the cement raw meal, forming a fusion which essentially consists of the added sulphate compound and a smaller quantity of alkali sulphates ($K_2SO_4$ and $Na_2SO_4$).

In principle, the sulphatic compound may be selected among all types of sulphates which do not have any adverse effect on the quality of the finished cement. It would be particularly advantageous to use calcium sulphate, either naturally occurring or industrial by-products and regular waste materials, e.g. in the form of used absorbent from dry exhaust gas desulphurization. If the raw meal itself has a low content of alkali metals, a certain amount of the sulphate source can be added as alkali sulphate. Also, the sulphate compound may, to a certain extent, be introduced together with the fuel.

It is a distinctive feature of this fusion that its quantity varies evenly with the temperature and that, to a major degree, it is independent of the sulphate content, as long as this content is sufficiently high.

Optimum temperature conditions for nodulization of the calcined raw meal by means of this fusion exist within the temperature range 1100°–1250°.

In order to carry out the method according to the invention it is an essential requirement, as mentioned in claim 1, that the sulphate content of the calcined raw meal is considerably higher than the alkali oxide content. It is preferable to ensure compliance with the following formula (the percentages indicated are percentages by weight):

$$\%SO_3 > \%K_2O + 1.5 \cdot \%Na_2O$$

where the $SO_3$ percentage is the total content of sulphate in the material streams into the process.

BRIEF DESCRIPTION OF THE DRAWINGS

The invention is explained in further details in the following with reference to the drawing which shows an example of a plant in which the method according to the invention can be used. This plant is, subject to few modifications, known from European patent No. 0380878 (Dec. 14, 1989, F.L. Smidth & Co., A/S).

DESCRIPTION OF THE PREFERRED EMBODIMENTS

In the FIGURE is shown a plant for manufacturing of cement which comprises a preheater which consists of three preheater cyclones 1, 2 and 3, a calciner 4 with a separation cyclone 5, a stationary reactor 6, which is located below the calciner 4 and a unit 7 in which the final reaction of the clinker can take place, and a clinker cooler 8. The unit 7 may e.g. be a fluid bed chamber or a short rotary kiln.

In operation, cement raw meal is fed to the plant through an inlet 9 and then conveyed in known manner through the preheater cyclones 1, 2 and 3 to the calciner 4 via a duct 10. The calciner 4 is fed with fuel via an inlet 11 and the sulphatic compound through an inlet 11a. Combustion air is added through one or several ducts 12 from the clinker cooler 8.

In the calciner 4 the preheated raw meal is calcined in gas suspension and the suspension of exhaust gas and calcined raw meal is subsequently directed via an outlet 5a to the separation cyclone 5 from which the exhaust gas continues up through the preheater 1, 2 and 3, before it is eventually discharged through an outlet 13. The calcined raw meal is directed from the separation cyclone 5 down into the reactor 6 via a duct 14.

The reactor 6 is provided with combustion air from the unit 7 through a duct 15 and with fuel via an inlet 16. The unit 7, to which the finished clinker is directed, is supplied with air and fuel to an extent necessary to allow the final reaction of the clinker to take place in an appropriate environment. Finally, the clinker passes via a duct 18 into the cooler 8.

In the case where the reactor 6 is a spouted bed, the calcined raw meal will, when it is introduced via the duct 14, flow down along the conical walls in the lowermost part of the reactor 6. When the raw meal reaches the bottom of the conical part, the small particles will be entrained in the upward-flowing combustion air which is supplied via the duct 15. This will cause a spouted bed to be formed, in which the material is circulated in a characteristic pattern, with the material being converted into nodules with constantly increasing particle dimensions.

When the particles have attained a weight which is such that the pull of the nodules exerted by the gravitational force is greater than the force which is generated by the upward-flowing gas, the finished nodules fall down through the conical part of the reactor and down through the duct 15 to the unit 7. In the unit 7, the generated nodules will have the necessary time to react so that the desired clinker minerals are formed. The size of the finished nodules depends on the gas volume which is drawn through the duct 15, and hence on the velocity of the gas.

A test was carried out during which calcined raw meal was granulated in the reactor 6 without additional input of sulphate, exclusively using the raw meal's own oxide fusion. At a temperature of about 1325° C. it was possible to produce nodules, but it was unavoidable that a substantial part of the material was accumulated on the sides of the reactor chamber to such an extent that operation was not possible for more than 5 hours. This result is attributed to an excessive quantity of fused material during the granulation process.

In a second test, the temperature was significantly reduced to about 1200° C. In the event, it emerged that the granulation process was brought to an almost complete standstill, with only sporadic quantities of nodules being discharged from the reactor 6. Instead, a violent circuit of material was established between calciner 4, separation cyclone 5 and the reactor 6.

In a third test, 5 kg of finely ground gypsum was added per 100 kg raw meal to the calciner 4 via the inlet 11a and the temperature in the reactor 6 was set for 1200° C. After a certain time period, an equilibrium was established in the circuit between calciner 4, separation cyclone 5 and reactor 6, with granular material being discharged from the reactor through 15 in a flow stream equivalent to the input of raw materials at 9 and 11a. The manufactured cement clinker had a mean particle size of 3 mm.

I claim:

1. A method for manufacturing Portland cement clinker comprising the steps of:
   (1) drying and preheating cement raw material;
   (2) calcining the dried, preheated raw material in a calciner;
   (3) burning the calcined raw material in a stationary walled reactor chamber at a temperature between 1000°–1300° C.;
   (4) adding to the cement raw meal during the drying, preheating, calcining or burning steps a quantity of sulfate compound sufficient to cause the formation of a melting phase;
   (5) controlling the quantity of said melting phase by adjusting the temperature in the calciner or reactor, such that clinkerized product is withdrawn from the reactor in the form of nodules with a fineness of more than 80% in excess of 0.5 mm, and without substantial accumulation of material on the walls of the stationary reactor chamber.

2. A method according to claim 1 wherein the temperature in the reactor is maintained at 1100° C. and 1250° C.

3. A method according to claim 1 wherein the amount by weight of sulfate in the raw material is greater than the combined percent by weight of $K_2O$ plus 1.5 times the percent by weight of $Na_2O$.

4. A method according to claim 1 wherein the sulfate is calcium sulfate.

* * * * *